Figure 1:
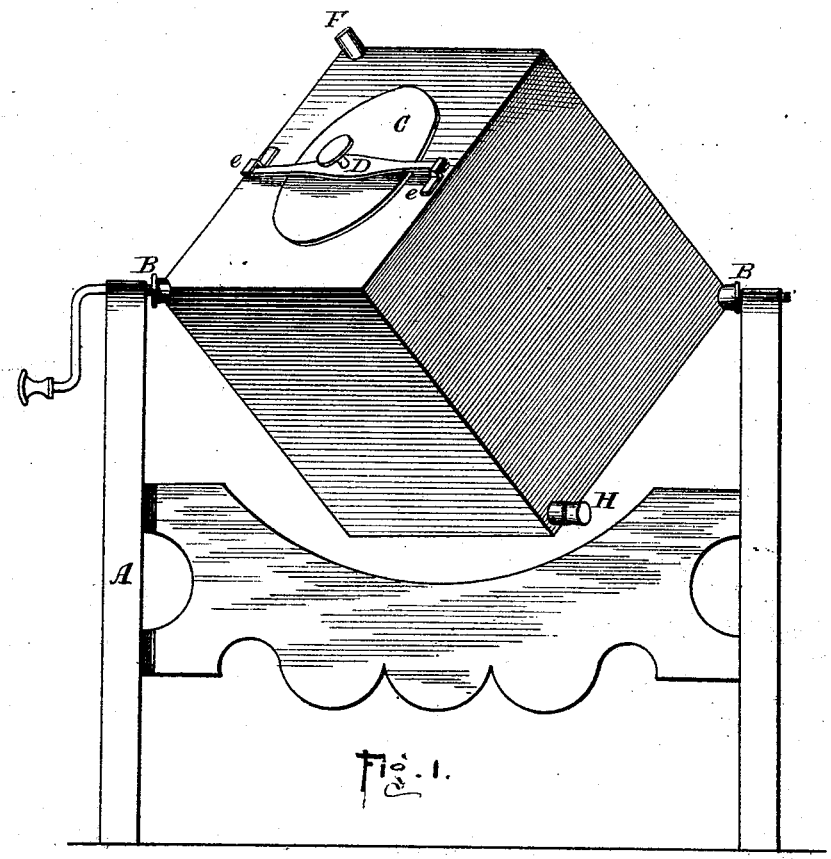
Figure 2:
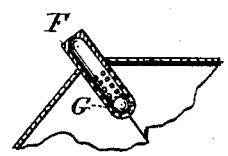

DAVIDSON & DURRETT.

Improvement in Churns.

No. 127,406.  Patented June 4, 1872.

Witnesses:
Edw. W. Donn
Alep Mahon

Inventor:s,
W. T. Davidson &
W. H. Durrett,
B. S. Roberts
Att'y 127,406

UNITED STATES PATENT OFFICE.

WILLIAM C. T. DAVIDSON AND WALTER H. DURRETT, OF HANNIBAL, MO.

IMPROVEMENT IN CHURNS.

Specification forming part of Letters Patent No. 127,406, dated June 4, 1872.

Be it known that we, WILLIAM C. T. DAVIDSON and W. H. DURRETT, of the city of Hannibal, county of Marion and State of Missouri, have invented certain new and useful Improvements in Churns; and do hereby declare the following to be a full and accurate description of the same, reference being had to the annexed drawing making a part thereof.

Our invention relates to that class of churns which are hung upon trunnions at the diagonal corners, and are prismatic in shape, as hereafter described.

The drawing represents the churn completed; also a sectional view of the tube and valve.

A reference to the drawing and to the following description will enable the skillful mechanic to put the same together.

A is a frame for supporting the prismatic box and its connections. B B are trunnions, fastened to the box upon diagonal corners. C is the lid. D is a transverse bar, fastened at the center to the center of the lid by a pivot-screw so as to turn, and catches at its ends under the inclined-surfaced catches E E so as to secure the lid tightly. F is a hollow tube, perforated freely on the inner extension, and with a single perforation in the outer end, each end being conical. This tube contains a round ball-valve, G, which opens and closes the outer hole of the tube by falling to and from the ends as the churn is revolved, thus admitting fresh air to enter, and permitting the gas which is generated in churning by the breaking of the globules or sacs, in which the butter is contained, to escape. H is a tube and cork to let out the buttermilk after the butter has been taken out at the lid.

These several parts above described form the churn complete; and the process of obtaining the butter from milk or cream consists in revolving the said prismatic box by means of the crank I, which produces a zigzag current in the milk, and this current is broken as it comes in contact with the angles of the six corners in succession, thus affording all the motion and friction necessary; and the atmosphere introduced by the ball-valve is all that is necessary in reducing the milk or cream to butter; and as fresh air is supplied and the gas allowed to escape at the valve the churning is speedily and effectually done with great ease, and the butter is sweet and wholesome.

What we claim, and desire to secure by Letters Patent, is—

The prismatic box, revolving upon trunnions placed diagonally, as shown, in combination with the perforated tube F and ball-valve G, substantially as and for the purpose described.

W. C. T. DAVIDSON. [L. S.]
W. H. DURRETT. [L. S.]

Witnesses:
ALEXANDER BOWLING,
F. K. ROGERS.